US006140631A

United States Patent [19]

Hamanaka et al.

[11] Patent Number: 6,140,631

[45] Date of Patent: Oct. 31, 2000

[54] PHOTOSENSOR FOR USE IN ELECTROPHOTOGRAPHY

[75] Inventors: Hiroaki Hamanaka; Norihiro Sakamoto, both of Hiratsuka; Fumiyuki Suda, Yokohama, all of Japan

[73] Assignee: Stanley Electric Co., Ltd., Tokyo, Japan

[21] Appl. No.: 09/136,958

[22] Filed: Aug. 20, 1998

[30] Foreign Application Priority Data

| | | | |
|---|---|---|---|
| Sep. 5, 1997 | [JP] | Japan | 9-241078 |
| Oct. 15, 1997 | [JP] | Japan | 9-281880 |

[51] Int. Cl.[7] .............................. G02B 1/10; G03G 5/00; H04N 3/14

[52] U.S. Cl. ...................... 250/214 R; 250/216; 257/431

[58] Field of Search ............................ 250/214.1, 214 R, 250/208.1, 208.2, 216; 358/471, 482; 257/431, 432, 433

[56] References Cited

U.S. PATENT DOCUMENTS

| | | | |
|---|---|---|---|
| 4,887,166 | 12/1989 | Kakinuma et al. | 358/471 |
| 4,931,873 | 6/1990 | Nishiura | 358/482 |

*Primary Examiner*—John R. Lee
*Attorney, Agent, or Firm*—James Creighton Wray; Meera P. Narasimhan

[57] ABSTRACT

A first object of the present invention is to provide a photosensor for use in an apparatus such as a copying machine, a printer etc. employing an electrophotographic technology which can prevent an image anomaly such as a blurring from generation even if it is exposed to a high-humidity ambient for a long period and subjected to multiple repetitions of numerous printing characters.

A second object of the invention is to provide a photosensor for use in electrophotography which is excellent in surface abrasion durability, humidity resistivity etc.

To satisfy the first purpose mentioned above, a photoconductive layer 2 formed of an amorphous layer including silicon atoms as a major element is deposited on a conductive substrate 1 formed of aluminium etc. A surface protective film 4 formed of another amorphous film including the silicon atoms as the main element, for instance, an a-SiC or an a-SiNC film is stacked on the layer 2 by adjusting a contact angle of the film 4 with de-ionized water measured in an open air ambient so as to be larger than about 76°.

To satisfy the second purpose mentioned above, another photosensitive layer 13 is grown via an adhesion enhancement layer 12 onto another conductive substrate 11, on an outside of which another surface protective film 16 including nitrogen and carbon atoms as well as the silicon atoms also as the major element is deposited.

6 Claims, 2 Drawing Sheets

PHOTOSENSOR FOR USE IN ELECTROPHOTOGRAPHY

BACKGROUND OF THE INVENTION

1. Field of the Invention

The present invention relates to a photosensor for use in electrophotography adopted in an apparatus such as a copying machine, a printer, a facsimile etc. which employs a copying process, for instance, of the Carlson method.

2. Brief Description of the Prior Art

FIG. 5 is a cross-sectional view for illustrating a schematic constitution of an exemplified conventional photosensor in general for use in a copying machine or in a printer which employs an electrophotographic technology. In FIG. 5, a numeric character 1 stands for an electrically conductive substrate, 2 stands for an amorphous photoconductive layer which includes silicon atoms as a major element and 3 stands for a surface protective film for protecting the photoconductive layer 2.

On the other hand, another constitution shown in FIG. 6 has been proposed as another exemplified conventional photosensor for use in the copying machine or in the printer employing the electrophotographic technology. In FIG. 6, a numerical sign 11 stands for another conductive substrate, 12 stands for an adhesion enhancement film, 13 stands for another photosensitive layer and 14 stands for another surface protective film, all of which are formed as an consecutive amorphous film 15.

The photosensor for use in electrophotography constituted as mentioned above are fabricated by decomposition of silane gas (referred to as "$SiH_4$") employing a glow discharging technology. During that, an adequate amount of hydrogen gas (referred to as "$H_2$") is doped to reduce a dangling bond density in the film by a termination technology using hydrogen atoms while a desired amount of boron atoms (referred to as "B") is doped to improve an electric charge retaining ability of the photosensor. As a result, a film resistivity measured in a dark space is increased to be higher than $10^{12}$—$10^{13}$ ohm-cm, which makes the photosensor adaptable to an electrophotographic process (copying process) utilizing the Carlson method.

In the conventional amorphous silicon (referred to as "a-Si") photosensor for use in electrophotography including the silicon atoms as the major element, however, there have been big problems as follows:

(A) Although the first-type conventional photosensor mentioned above provides initially an excellent image, a storage in an open air atmosphere or in a highly humid ambient for a long period of time frequently induces image failures, in particular blurrings and flowed images, while continuous repetitions of printing numerous numbers of characters result in the flowed image failures.

Origins of generating the anomalous images have been thought in general attributed to it that an outermost surface of the photosensor is chemically deteriorated, being suffered from ill effects of chemical species such as ozons, nitrogen oxidants, nascent oxygens etc. generated by corona discharging phenomena which take place during machine processings.

Many species of the surface protective films made of the a-Si compounds have been developed to prevent the image failures mentioned above from generation and simultaneously to improve a surface durability during printing. However, any protective film which can cope with all causes of the image failures has not been developed yet. (B) On the other hand, the second-type conventional photosensor mentioned above for use in electrophotography which is formed of the a-Si compounds exhibits a higher pressure durability against a force applied from an external because it has a higher hardness compared with any other photosensors. However, strong demands for acceleration in printing speed and for a full-color printing have recently diversified the printing processes themselves so that some printing processes cause flaws on a surface of the photosensor due to constituent material dependence of the protective film, which turns to be another origins of the image defects.

When the second-type conventional photosensor is used in a high-temperature and high-humidity ambient on the contrary, either the flowed images or the blurrings generate frequently. Those phenomena similarly depend much on the constituent materials and so on.

Although both aforesaid image failures originated from the flaws and above-mentioned flowed images caused from the corona discharge should be eliminated from the photosensor to be used for electrophotography, elimination of all of such defects is difficult at present from the photosensors formed of the a-Si materials, conclusively.

SUMMARY OF THE INVENTION

The present invention is carried out first to solve the problems (A) mentioned above. A first object of the present invention is to provide a photosensor for use in electrophotography which is excellent both in humidity resistivity and in corona discharge durability, thereby to enable preventing image anomalies such as blurrings etc. from generating and affording supreme output images.

Similarly, the present invention is carried out to solve aforesaid problems (B). A second object of the present invention is to provide a photosensor for use in electrophotography which is excellent in abrasion tolerance as well as in humidity resistivity and in corona discharge durability.

To satisfy the first purpose mentioned above, a photosensor for use in electrophotography according to the present invention is constituted as follows:

(1) A photosensor for use in electrophotography, comprising:

a photoconductive film which is stacked thereon with a surface protective film, wherein:

the surface protective film is fabricated by depositing an amorphous silicon carbide (referred to as "a-SiC") film so as to have a larger contact angle with de-ionized water measured in an open air ambient than approximately 76 degrees.

(2) A photosensor for use in electrophotography, comprising:

a photoconductive film which is stacked thereon with a surface protective film, wherein:

the surface protective film is fabricated by depositing an amorphous silicon nitrided carbide (referred to as "a-SiNC") film so as to have a larger contact angle with the de-ionized water measured in an open air ambient than about 76°.

(3) The photosensor according to (1) and (2), wherein:

the photoconductive layer is formed of an amorphous material which includes silicon atoms as a major element.

To satisfy the second purpose mentioned above, another photosensor for use in electrophotography according to the present invention is constituted as follows:

(4) A photosensor for use in an electrophotographic process, wherein:

a surface protective film including nitrogen and carbon atoms beside silicon atoms of a major element is provided on an outermost surface of the photosensor.

(5) The photosensor according to (4), wherein:

the surface protective film is formed as one of amorphous films together with a photosensitive layer which is formed inside the surface protective film.

DETAILED DESCRIPTION OF PREFERRED EMBODIMENTS

Hereinafter described are the preferred embodiments according to the present invention with reference to the drawings of FIGS. 1 to 4. The best modes contemplated during carrying out the present invention into practice are also described corresponding to the preferred embodiments.

Embodiment 1

Figure 1:
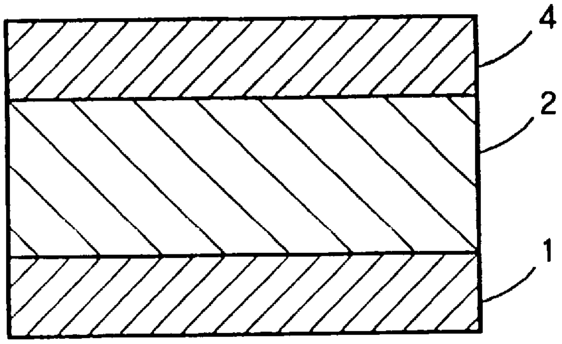
FIG. 1 is a cross-sectional view showing a constitution of a photosensor for use in electrophotography of Embodiment 1 according to the present invention.
Figure 5:
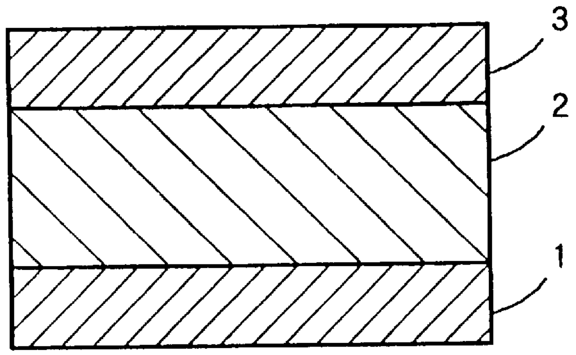
FIG.5 (PRIOR ART)
FIG. 5 is a cross-sectional view showing a first exemplified conventional constitution of the prior photosensor for use in electrophotography.
Figure 6:
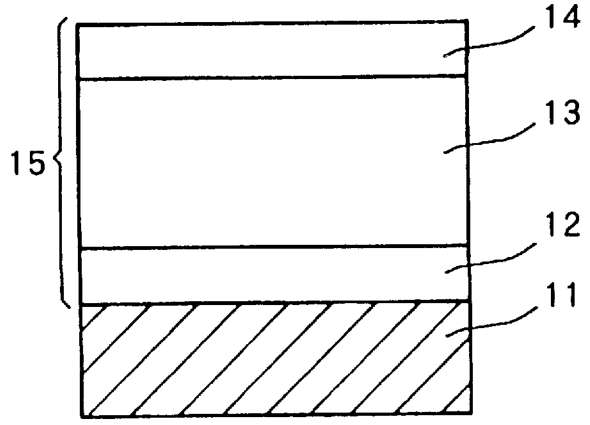
FIG.6 (PRIOR ART)
FIG. 6 is a cross-sectional view showing a second exemplified conventional constitution of the prior photosensor for use in electrophotography.

FIG. 1 is a cross-sectional view showing a constitution of a photosensor for use in electrophotography of Embodiment 1 according to the present invention, wherein the same numerical signs as those in FIG. 5 represent the same constituents as those of FIG. 5.

In FIG. 1, a numerical character 1 stands for an electrically conductive substrate, to which metallic aluminium materials are applied in general and, in particular cases, compound conductive materials formed of transparent insulating plates such as glass plates, acrylic resin polymer, other polymerized plastic resins etc. coated with transparent membranous conductive electrodes, for instance, indium-tin oxide (referred to as "ITO"), tin oxide (referred to as "$SnO_2$"), zinc oxide (referred to as "Zn O") etc. are applied.

Figure 2:
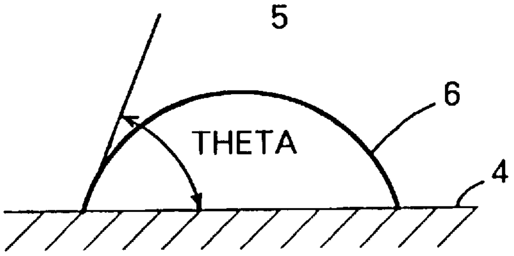
FIG. 2 is a view for illustrating a contact angle of de-ionized water with a surface of the photosensor of FIG. 1.

A numerical character 2 stands for an amorphous photoconductive layer including silicon atoms as a major element and having a structure wherein either at least a singularity or a plurality of layers which exhibit different functions from each other are laminated. A numeric sign 4 stands for a surface protective film stacked on the photoconductive film 2 to act a role of protecting the photoconductive film 2 against ill effects of moistures, nitrogen oxides (referred to as "NOx"), oxidations and external pressures. The surface protective film 4 is formed of either an a-SiC or an a-SiNC film which includes the silicon atoms as a major element so as to turn a contact angle THETA of the surface with a droplet 6 of the de-ionized water measured in an open air atmosphere 5 greater than approximately 76 degrees as shown in FIG. 2.

By preparing the surface protective film so that the contact angle of the de-ionized water on the surface of the photosensor measured in the open air ambient is larger than 76 degrees as mentioned above, the photosensor for use in electrophotography according to the present embodiment can be improved to be excellent in humidity tolerance and in corona discharging durability, thereby to prevent anomalies in image such as blurrings etc. from generation and to guarantee providing excellent image outputs for a long period of time.

TABLE 1

| Film Species | Contact Angle | Printed Character Image Quality |
|---|---|---|
| a-Si:H | 20° (THETA) | Bad |
| a-SiN | 40° | Poor |
| a-SiC | 80° | Excellent |
| a-SiNC | 76° | Excellent |

Table 1 tabulates surface protective film composition dependences of both contact angle and printed character image quality after the photosensor is exposed to a highly humid ambient. Herein "Excellent" means that extremely superior images of the printed characters are attained while "Poor" means that a little bit anomalous images of the printed characters such as partially generated blurrings appear. "Bad" means that extremely anomalous images of the printed characters such as blurrings throughout a whole field generate.

The printing test results indicate that photosensors which have the higher contact angles than 76 degrees do not generate any blurrings at all.

Durability abilities of 3 photosensors which respectively have one of 3 species of the amorphous films, namely a-SiN, a-SiC and a-SiNC films as each surface protective film are investigated by making a hundred thousand sheets of copies for each. During the durability test mentioned above, a dry-type development process does not induce any anomalous images of the printed characters such as the blurrings when the images are developed by the respective photosensors each having one of 3 species of the amorphous surface protective films. However, a wet-type development process induces a quite different result which depends on the materials of the surface protective films on the contrary. Namely, while the photosensor having either the a-SiC film or the a-SiNC film as each surface protective film does not induce any anomalous images of the printed characters such as the blurrings, the photosensor having the hydrogen-terminated (hydrogenated) amorphous silicon (referred to as "a-Si:H") film as the surface protective film induces the seriously anomalous image of the printed characters such as the whole field blurring and the photosensor having the a-SiN film as the surface protective film induces the anomalous images of the printed characters such as the partial blurrings.

As mentioned above, if either the a-SiC film or the a-SiNC film including the silicon atoms as the main element of the amorphous materials is adopted as the surface protective film of the photosensor, thereby to enlarge the contact angle of the surface with the de-ionized water measured in the open air ambient larger than 76 degrees, the excellent output images can be attained without inducing any anomaly in image.

A technology according to the present embodiment has the effects that it provides the photosensor which is excellent in humidity resistivity and in corona discharging durability, thereby enabling to prevent image anomalies such as blurrings from generation and to produce supreme output images for a long period of time, as mentioned above.

Embodiment 2

Figure 3:
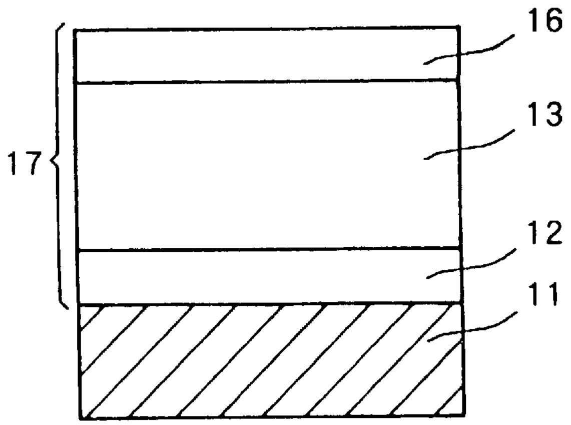
FIG. 3 is a cross-sectional view showing another constitution of another photosensor for use in electrophotography according to Embodiment 2 of the present invention.

FIG. 3 is a cross-sectional view showing another constitution of another photosensor for use in electrophotography according to Embodiment 2 of the present invention.

In FIG. 3, a numerical character 11 stands for an electrically conductive substrate which is formed in general of metallic aluminium materials but, in particular cases, is formed of an insulating substrate such as a glass plate, an acrylic resin plate, a plastic substrate etc. of which surface is coated with an transparent conductive film such as ITO, $SnO_2$, ZnO etc. The substrate 11 is to be deposited thereon with an amorphous film 17. Another numerical character 12 stands for an adhesion enhancement film for enhancing an adhesion force between the conductive substrate 11 and upper amorphous films. A still another numerical character 13 stands for a photosensitive layer which is fabricated by stacking a singularity or a plurality of photoconductive films each having a photosensitive characteristics.

A further still another numerical character 16 in FIG. 3 stands for a surface protective film located outermost on the photosensitive layer 13 and formed of an a-SiNC film including nitrogen and carbon atoms together with silicon atoms as a major element for protecting aforesaid photosensitive layer 13 formed of the photoconductive films against moisture, NOx, oxidation and/or effects of physical and mechanical forces applied from an outside. A stratified structure in amorphous films 17 which have respectively different functions from each other is composed of aforesaid surface protective film 16, the adhesion enhancement film 12 located inside and the photosensitive layer 13.

Figure 4:
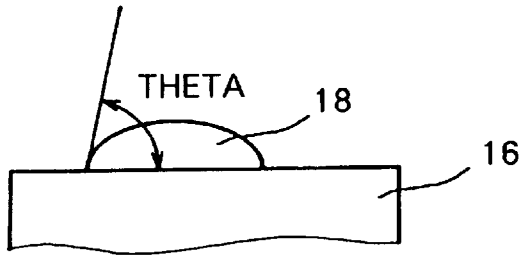
FIG. 4 is a view for illustrating a method for measuring the contact angle of the de-ionized water located on the surface of the photosensor shown in FIG. 3.

The present embodiment can provide a surface protective film having a hardness as high as that of the a-SiN film and simultaneously having a contact angle with the de-ionized water measured in the open air ambient as high as that of the a-SiC film as shown in FIG. 4 by choosing an a-SiNC film as the surface protective film 16 as mentioned above, which can improve much the abrasion resistivity, the corona discharging tolerance and the humidity durability of the photosensor.

FIG. 4 is a view for illustrating a method for measuring aforesaid contact angle, wherein a numerical character 18 stands for a water droplet formed of the de-ionized water on the surface protective film 16.

TABLE 2

| Film Species | Gas Flow Rate | Gas Pressure | RF Power | Film Thickness |
|---|---|---|---|---|
| a-SiNC | $SiH_4$ = 200 SCCM<br>$N_2$ = 500 SCCM<br>$CH_4$ = 500 SCCM | 1.0 Torr | 1.0 kW | 3,000 A |

Table 2 tabulates an exemplified condition under which the a-SiNC film is grown. Herein each flow rate of component gases is measured and controlled by a unit of standard cubic centimeter per minute at 1 atmospheric pressure and at room temperature (25° C.) (referred to as "SCCM"). A gaseous pressure monitored by a vacuum gauge attached to a glow discharge chamber is controlled to be about 1 Torr (1/760 of an atmospheric pressure, namely 133.3224 Pa). A radio frequency (referred to as "RF") power supplied from an RF oscillator to the glow discharge chamber is about 1 kW. Film thichness measured by a use of an ultraviolet film thickness analyzer is about 3,000 Angstrom (referred to as "A").

Table 3 tabulates obtained protective film composition dependences of both contact angle and image quality after a long period exposure to a highly humid ambient according to the present embodiment. Table 3 indicates that the observed data about the contact angle and the image quality are quite similar to those of Embodiment 1 shown on Table 1, namely that the resulted data depend mainly upon the species of the surface protective film no matter what an underlayer structure may be as well as that reproducibilities in experiment are very good. In Embodiment 2, the films having high contact angles do not induce any blurring in image after exposure to the high humidity ambient, either, actually indicating that the a-SiC and the a-SiNC films induce no blurring at all.

TABLE 3

| Film Species | Contact Angle | Printed Character Image Quality |
|---|---|---|
| a-Si:H | 20° (THETA) | Bad |
| a-SiN | 40° | Poor |
| a-SiC | 80° | Excellent |
| a-SiNC | 76° | Excellent |

Table 4 tabulates scratching hardness of various surface protective films shown on Table 3. The scratching hardness is measured by a scratching hardness meter for applying various weights from zero to 50 grams (referred to as "g") to a sample film to be measured and for defining the relative value in hardness with a destructive load which just destructs the film. Table 4 clarifies that the a-SiNC film is excellent in scratching hardness and in abrasion durability as just like as the a-SiN film. Accordingly, the photosensor on which the a-SiNC film is used as the surface protective film will suffer from about ten times less occurrences in scratching failures compared with the surface protective film formed of the a-Si:H film during serving in a field market.

TABLE 4

| Film Composition | Scratching Hardness |
|---|---|
| a-Si:H | 1.0 g |
| a-SiN | 9.5 g |
| a-SiC | 3.0 g |
| a-SiNC | 9.0 g |

As mentioned above, a technology according to the present embodiment can provide a photosensor which is excellent not only in humidity resistance and corona discharge durability but also in abrasion tolerance, thereby enabling to guarantee a supreme image quality for a long period.

What is claimed is:

1. A photosensor for use in electrophotography, comprising:

a surface protective film stacked on a photoconductive layer, wherein it is characterized by that:

said surface protective film is formed of an amorphous silicon nitrided carbide film.

2. The photosensor for use in electrophotography according to claim 1, characterized by that:

said photoconductive layer is formed of an amorphous material which includes silicon atoms as a main element.

3. The photosensor for use in electrophotography according to claim 1, wherein it is characterized by that:

said surface protective film is formed by depositing silicon, nitrogen and carbon atoms from a mixture of silane, nitrogen and methane gases.

4. The photosensor for use in electrophotography according to claim 3, wherein it is characterized by that:

a contact angle of said surface protective film with de-ionized water measured in an open air ambient is adjusted so as to be larger than approximately 76 degrees.

5. A photosensor for use in electrophotography, wherein it is characterized by that:

a surface protective film including nitrogen and carbon atoms as well as silicon atoms as a major element is formed on an outermost surface of said photosensor.

6. The photosensor for use in electrophotography according to claim 5, wherein it is characterized by that:

said surface protective film is formed as the same amorphous material as that of a photosensitive layer located inside said surface protective film, wherein nitrogen and carbon atoms are added simultaneously when said film is formed.

* * * * *